April 2, 1968     S. REDMOND     3,375,636

PLASTIC MATERIAL FORMER AND WRAPPER

Filed Oct. 14, 1964     5 Sheets-Sheet 1

INVENTOR.
SANFORD REDMOND
BY *John H. Glaccum*

April 2, 1968  S. REDMOND  3,375,636
PLASTIC MATERIAL FORMER AND WRAPPER
Filed Oct. 14, 1964  5 Sheets-Sheet 2

INVENTOR.
SANFORD REDMOND

April 2, 1968  S. REDMOND  3,375,636
PLASTIC MATERIAL FORMER AND WRAPPER
Filed Oct. 14, 1964  5 Sheets-Sheet 3
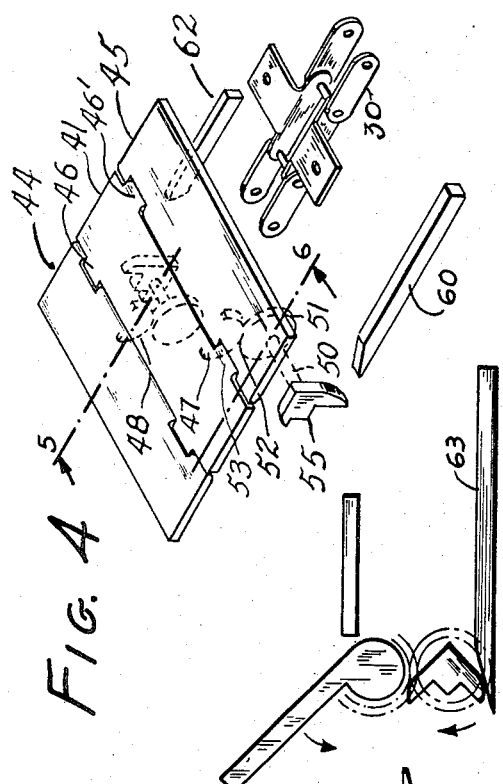
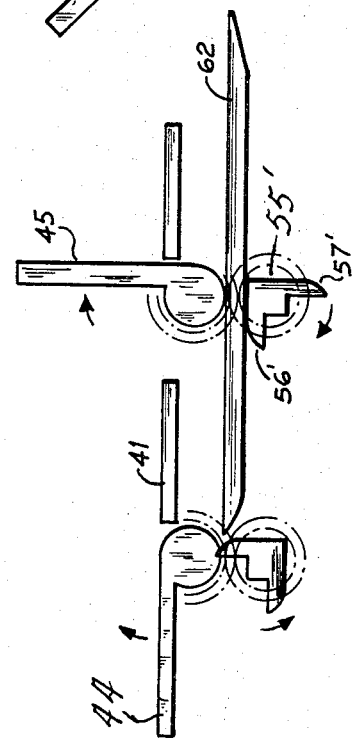
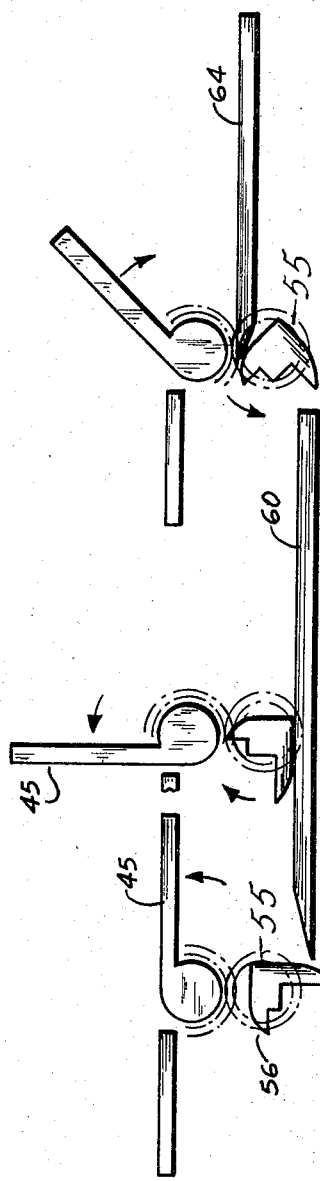
INVENTOR.
SANFORD REDMOND

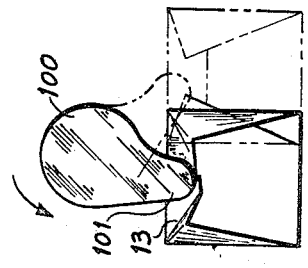
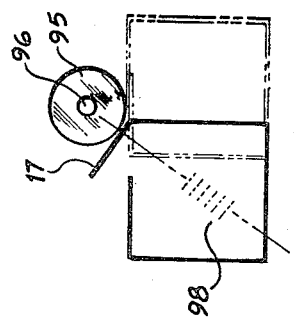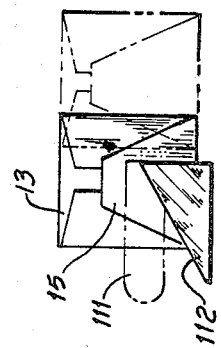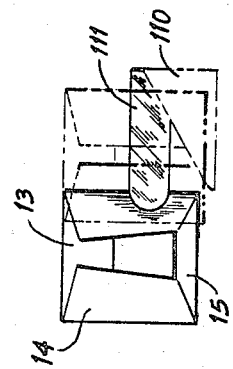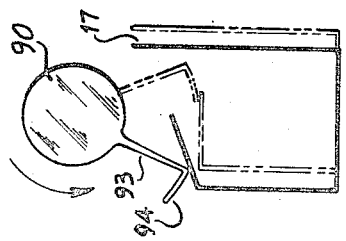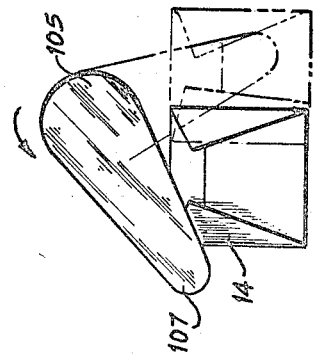

April 2, 1968  S. REDMOND  3,375,636
PLASTIC MATERIAL FORMER AND WRAPPER
Filed Oct. 14, 1964  5 Sheets-Sheet 5

INVENTOR.
SANFORD REDMOND
BY John H. Slocum

United States Patent Office 3,375,636
Patented Apr. 2, 1968

3,375,636
PLASTIC MATERIAL FORMER AND WRAPPER
Sanford Redmond, 3 E. 69th St.,
New York, N.Y. 10021
Filed Oct. 14, 1964, Ser. No. 403,707
5 Claims. (Cl. 53—122)

ABSTRACT OF THE DISCLOSURE

The invention employs a forming drum which forms plastic material into predetermined size and shaped blocks and places them upon a wrapper which is subsequently wrapped about the block and the ends tucked by novel tucking means to form a complete package.

---

This invention relates to the forming of any plastic material into a predetermined shape of a predetermined weight, and wrapping the product, so formed, in a suitable wrapper. For the purpose of explanation and description, the material will be referred to as butter, but any material of similar moldability may be similarly handled. Whipped butter, cheeses, margarine, jams, and ice cream are a few examples.

An object of the invention is to provide equipment that will handle material in a bulk state, form it into individual sections of a predetermined size and shape, wrap each section in a suitable wrapper and deliver each section in a sanitary, protected condition.

A further object is to provide equipment of the type described in which the size of the section formed may be controlled and varied to produce a final section of a desired size. Obviously a unit of whipped butter within the unit under pressure will have a smaller volume than at the time of its release to the lower atmospheric pressures and the equipment must be so constructed as to automatically compensate for the difference.

With present day methods and the equipment now in use, an excessive amount of pressure is necessary to compress whipped or aerated products into the desired shape and form with the result that the product, after it has been exposed to atmospheric pressures has a tendency to expand causing many difficulties in the overwrapping and handling of the product. Another object of this invention, therefore, is to provide equipment with which the product may be formed and wrapped under lower pressures, and to provide automatic means of allowing it to expand to atmospheric pressure while still being controlled within the forming head.

It will be appreciated that, with the present invention, the product will be delivered to the forming head under adequate, but not excessive, pressure in a constant, regular, consistent supply, formed into the desired shape, wrapped and delivered at the end of the machine in the completed state without being touched by human hands.

Some other objects of the invention are to provide a unit which will handle butter in its soft state directly from the churn without additional refrigeration. A further object is to provide a very high speed machine with capacity enough to handle the entire output of a margarine producing line. Speeds of presently available equipment require that the output be divided between two forming and wrapping machines.

A more complete appreciation of the invention and many of the attendant advantages thereof will become readily apparent as the same becomes better understood by reference to the following detailed description when considered in connection with the accompanying drawings wherein:

FIG. 4 is a detailed perspective view of a carrier showing its actuating mechanism.

FIG. 5 is a diagrammatic view showing a wing plate in its progressive positions with respect to the central plate, taken on the line 5—5 of FIG. 4.

FIG. 6 is a view similar to FIG. 5 of the other wing plate, taken on the line 6—6 of FIG. 4.

FIGS. 7 and 8 are views of the top folding mechanism.

FIGS. 9, 10, 11 and 12 are views showing the end tucking and flap folding mechanism.

Figure 1:
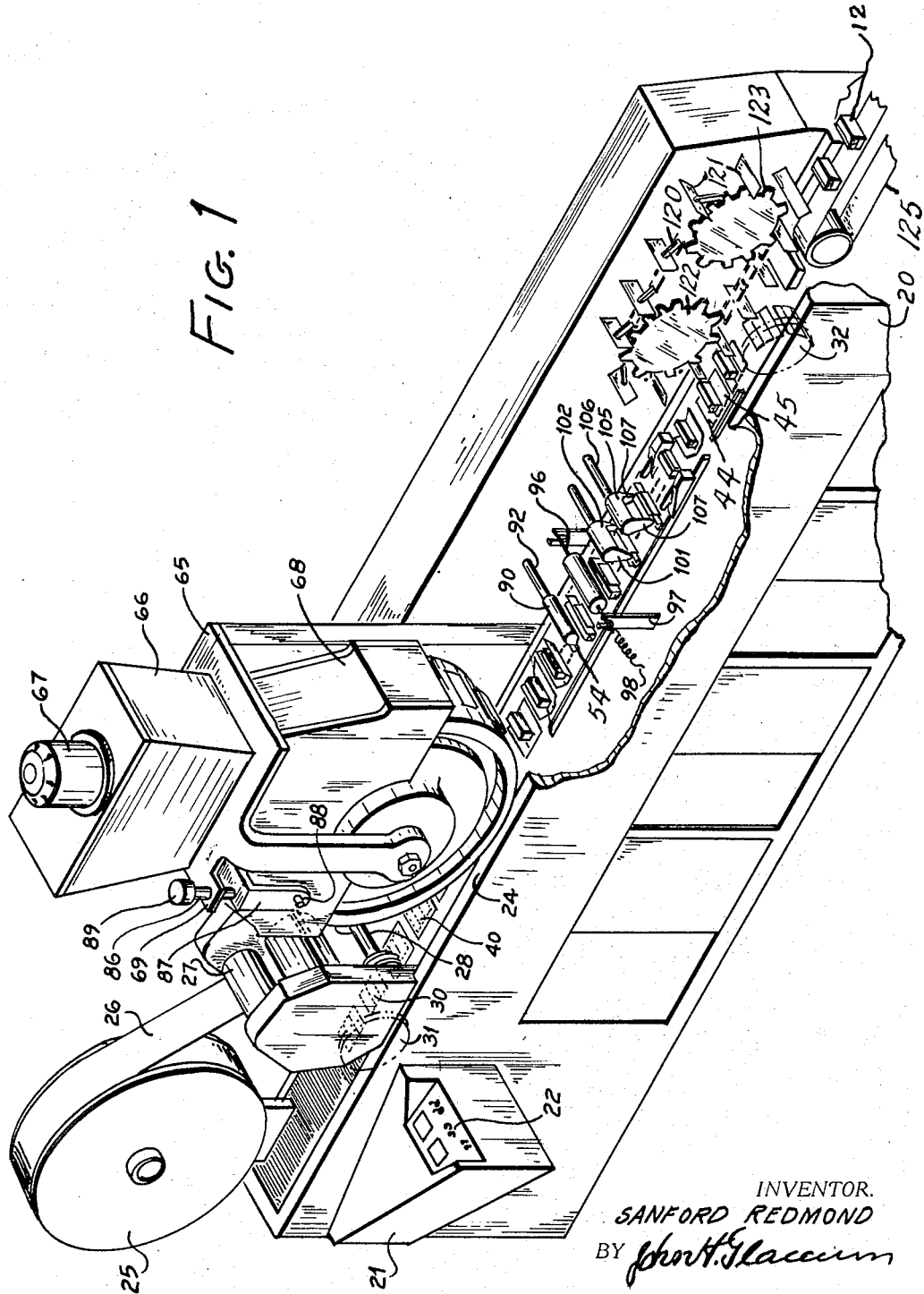
FIG. 1 is a perspective view of a form of a complete machine embodying the invention.
Figure 2:
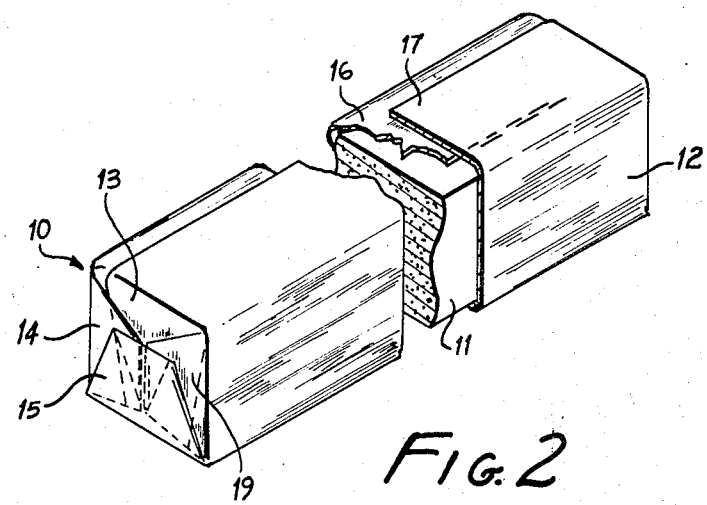
FIG. 2 is a perspective of the finished product completely wrapped with part of the wrapper broken away to show the product.
Figure 3:
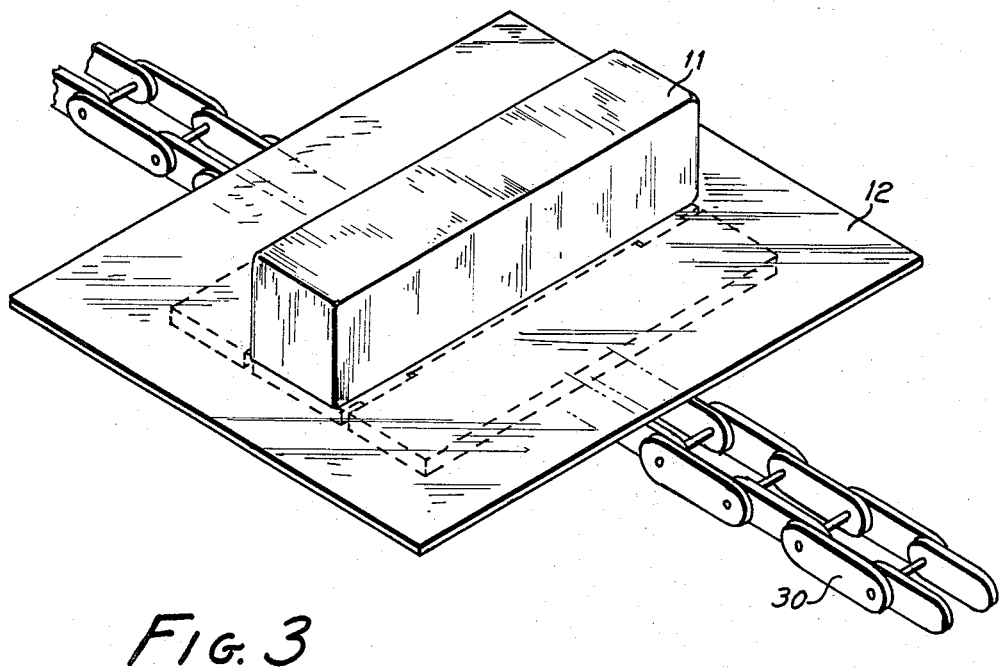
FIG. 3 is a perspective view of a carrier on the conveyor with the wrapper and the formed product thereon before being wrapped.

Referring more particularly to the drawings, the end product 10, shown in FIG. 2, is produced by the machine shown in FIG. 1. The end product 10 consists of the product 11, enclosed by the wrapper 12 with its ends tucked at 14 and folded at 15, with the top of the wrapper folded over to form flaps 16 and 17.

The machine shown in FIG. 1 includes a base 20 mounting a control box 21 with control buttons or dials 22 or other suitable devices. Mounted adjacent one end of the base 20 is a roll of wrapping material 25. The wrapping material 26 is fed down through rollers 27 and the rotary cutting knife 28, which cuts the wrapping material into segments of the proper size.

Also mounted in the base 20 is a conveyor 30 powered by the sprockets 31 and 32 moving the conveyor 30 along the bed 24 of the base 20. The conveyor 30 mounts a series of carriers 40 each of which is fastened to the flanges 33 on the links 34 of the conveyor. Each of the carriers 40 includes a central section or plate 41 having a depending flange 42 on one side and a similar flange 43 on the other. Wing plates 44 and 45 are hinged to the plate 41 by the shafts 46 and 46' and carry depending pinions 47 and 48 on inner ends. Mounted in the flange 42 below the shaft 46 is a second shaft 50 carrying the gear 51, the teeth 52 of which mesh with the teeth 53 of the pinion 47. At the outer end of the shaft 50 is a fixed block 55 having two cam engaging fingers 56 and 57.

As the carrier 40 is moved forwardly on the conveyor 30, the cam engaging finger 56 is engaged by the cam bar 60, causing the shaft 50 and the gear 51 to rotate in a clock wise direction, and through the pinion 48, causing the wine plate 45 to pivot to the vertical position.

In the same manner the cam engaging finger 56' on the block 55' engages the cam bar 62 to rotate shaft 50' and the gear 51' to cause the wing plate 44 to pivot to the vertical position, as shown in FIG. 5.

As the conveyor 30 and the carriers 40, precede, the cam engaging fingers 57 and 57' are engaged by the cam bars 63 and 64, causing the gears 50 and 50' to turn in the opposite direction to return the wing plates 44 and 45 to the horizontal position in the same plane as the central section or plate 41.

Positioned on the base 20 is a bracket or support 65 which supports the feed chamber or hopper 66 containing the material to be processed. Pressure may be applied to the material by means of varied devices ranging from an auger to a pump depending upon the product being run. The lower portion of the hopper 66, designated as 68, communicates with and encloses the upper portion of a forming and extruding drum 70. A pressure tight connection is maintained between the hopper and drum by a suitable seal 71 made of a material such as "Teflon" (a DuPont product).

Figure 13:
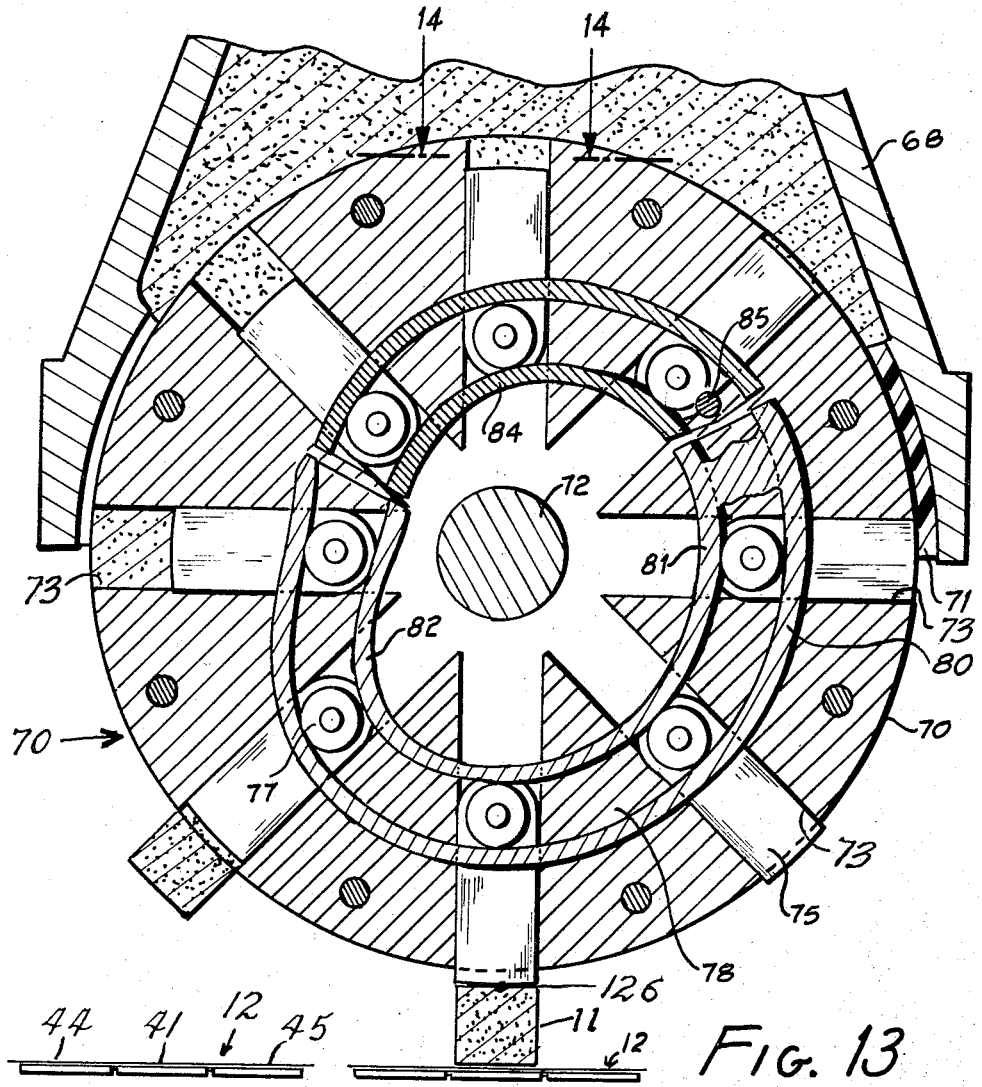
FIG. 13 is a cross sectional view of the forming drum and its position with relation to the hopper.
Figure 14:
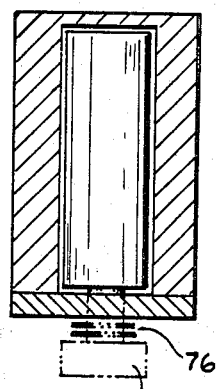
FIG. 14 is a cross sectional view taken on the line 14—14 of FIG. 13.

The drum 70 is similar and operates on similar principles to the drum shown in detail in FIG. 13 of my Patent No. 3,129,546, issued Apr. 21, 1964 by the U.S. Patent Office.

The drum 70 consists of an annular body mounted for rotation upon a shaft 72. It defines a number of chambers 73 about its periphery. In each chamber is a piston conforming to the shape of the chamber. The pistons are designated as 75. The inner ends of each piston 75 has a pin engaging a roller 77 which travels in a cam track 78 which consists of an outer track 80 and an inner track 81. The cam track 78 is in two sections 82 and 84. The section 84 is pivoted at 85, and the position of the section 84 is controlled by the knob 89 which through the shaft 86 threaded into the flange 87 of the bracket 65 engages the pin 88 to vary the intake of the pistons 75 by changing the relative position of the section 84 with relation to the section 82. This varies the travel of the pistons 75 and controls the depth of the final product. The linear and lateral size of the final product is, of course, decided by the shape and configuration of the chamber.

As the drum rotates, the material to be processed is fed from the hopper 66 through the section 68 into the chambers 73. It will be appreciated that as the portion of the drum 70 enters the lower portion 68 of the hopper 66, the pistons 75 located in that portion begin to withdraw into their respective chamber 73. This action not only opens the chamber to receive material from the hopper 66, but has a suctioning effect as well to further aid in filling the chamber. As the rotation of the drum 70 continues, the rollers 77 travelling in the cam track 78 force the pistons 75 outwardly toward the periphery of the drum 70 to discharge the material in the chambers 73.

In operation, the wrapping material 26 is fed from the roll 25 under the rotary knife 28 where it is cut into proper sized wrappers 12, and deposited on the conveyor 30, one wrapper 12 to each carrier 40. The conveyor 30 then moves the wrapper bearing carrier 40 under the forming drum 70 where a formed portioned of the product 10 is deposited on the wrapper 12.

As the conveyor 30 travels further the cam engaging fingers 56 and 56' are engaged by the cam bars 60 and 62 to raise the wing plates 44 and 45 to the vertical position and thus place the sides of the wrapper 12 against the sides of the product 11. After the sides of the wrapper 12 have been placed, the cam engaging fingers 57 and 57' are engaged by the cam bars 63 and 64 and the wing plates returned to the horizontal position. This completes the wrapping of the bottom and sides of the product 11.

The conveyor 30 then moves the carrier 40 under the counterclockwise rotating roller 90. The roller 90 has a depending arm 93 carrying the folding finger 94, and is mounted on the shaft 92. The arm 93 and the folding finger 94 fold the flap 16 over the top of the product 11.

From the above described position, the carrier 40 moves under the roller 95 which is freely mounted on the shaft 96 positioned in the brackets 97 and urged rearwardly by the spring 98. This folds the flap 17 downwardly and completes the top of the package, as shown in FIG. 8.

The next step is for the carrier 30 to progress under the roller 100 as shown in FIG. 9. There the finger 101 on the roller 100 turns down the end 13 of the wrapper 12. A similar finger 102 on the other end of the roller 100 turns down the other end of the wrapper.

As the conveyor 30 and the carrier 40 moves along, the roller 105 carrying the depending finger 107 folds the side flap 14 as shown in FIG. 10. From this position the conveyor 30 and the carrier 40 moves into the die 110 wherein the finger 111 folds the side flap 19 and the inclined surface 112 moves the bottom flap 15 into position. A corresponding action takes place at the other end of the package to complete it.

It will be appreciated that while I have described the various actions of the machine step by step they actually take place in one continuous action and at a high rate of speed, so that the finished product will be turned out at several hundred per minute.

At the far end of the frame 20 is positioned a conveyor 120 carrying the pushing blades 121. The conveyor or belt 120 is mounted on the sprockets 122 and 123 and the blades 121 move the finished product 12 onto the belt 125 which carry it to conventional packaging means (no shown).

It will be appreciated that the various movements of the machine are actuated by conventional means, such as electric motors or other power means (not shown), which may be varied without parting from the conceptive idea of the invention. Other obvious and expedient changes may also be made without departing from the spirit of the invention. For instance, a stripping wire 126 may be provided to strip the product 11 from the piston or plunger 75.

I claim:

1. In a machine for forming and wrapping plastic material, means to feed plastic materal to said machine, means to shape and form said material into predetermined shapes, a conveyor moving under said forming and shaping means, a plurality of carriers on said conveyor, each of said carriers having a central plate and a pair of winged plates hinged thereto, means feeding wrapping material from a roll into said machine, means wrapping material from a roll into said machine, means cutting said wrapping material into individual wrappers of a predetermined size, means placing each wrapper on a carrier as said conveyor pases under said cutting means, means depositing a shaped block of said plastic material from said shaping and forming means on said wrapper as it passes under said shaping and forming means and means to wrap said wrapper around the sides and ends of said shaped block of material, said means including cam means to pivot said wing plates on each carrier and the portion of the wrapper thereon to a position against the sides of said shaped block of material.

2. In a machine for forming and wrapping plastic material, a shaping and forming drum, hopper means feeding the material to said drum in a continuous, regular supply, a continuous moving conveyor under said drum, a plurality of carriers on said conveyor, each of said carriers having a central portion and a pair of winged plates hinged thereto, means feeding wrapping material into said machine at one side of said drum, means cutting said wrapping material into individual wrappers of a predetermined size, means placing each wrapper on a carrier as said conveyor passes under said cutting means, means depositing a shaped block of said plastic material from said shaping drum on each wrapper as it passes under said drum and means to wrap said wrapper around the sides and ends of said shaped block of material, said means including cam means to cause said wing plates on each carrier to pivot and to fold each wrapper against the sides of said block of material and additional fingers and cam plates to fold and tuck the ends of each wrapper.

3. In a machine for forming and wrapping plastic material having a forming and shaping drum, means feeding the material to be formed and wrapped to said drum, a source of wrapping material and means to supply individual wrappers to said machine, an endless conveyor, a plurality of carriers on said conveyor upon which the individual wrappers are deposited and upon said wrappers a block of the formed material is deposited from said drum, each of said carriers having a central portion and a pair of winged plates hinged thereto, each of said winged plates having a depending pinion, a shaft mounted below said wing plate, a gear on said shaft meshing with said pinion, a cam engaging block on said shaft, said block having two cam bar engaging surfaces, cam bars so positioned that when one of the cam bar engaging surfaces is engaged by a cam bar the winged plate will be pivoted to a vertical position to press the wrapper against the side of the block of material and that when the other of the cam bar engaging surfaces is engaged by another cam bar the winged plate will be returned to the horizontal position.

4. In a wrapping machine having a moving conveyor belt and a series of carriers mounted on said conveyor belt, means to deposit precut wrappers on said carriers, means to deposit a block of material to be wrapped on each of said wrappers, each of said carriers including a central plate attached to said conveyor belt and a pair of wing plates hinged to said central plate, each of said wing plates having a depending pinion, a shaft mounted below said wing plate, a gear fixed on said shaft meshing with said pinion, a cam engaging block on said shaft, said block having two cam engaging surfaces, cam bars so positioned that as the conveyor and carrier moves over said cam bars will be engaged by one of said cam bar engaging surfaces on said block to rotate said shaft and to pivot one of said wing plates ninety degrees to press said wrapper against the side of the block of material to be wrapped and that when the other of said cam engaging surfaces engages another of said cam bars the wing plate will be returned to its original position.

5. In a wrapping machine, a moving conveyor belt, a plurality of carriers mounted on said conveyor belt, means to deposit a precut wrapper on each of said carriers, means to form and deposit a block of material to be wrapped on each of said wrappers, each of said carriers including a central plate attached to said conveyor belt and a pair of wing plates hinged to said central plate, each of said wing plates having a depending pinion, a shaft mounted below said wing plate, a gear fixed on said shaft meshing with said wing plate, a cam bar engaging block on said shaft, said block having two cam bar engaging surfaces, cam bars so positioned that as said conveyor and each of said carriers moves over said cam bars one of said cam bar engaging surfaces on said block will engage one of said cam bars to rotate said shaft and to pivot said wing plate ninety degrees to press said wrapper against the side of the block of material to be wrapped and so that when the other of the cam engaging surfaces engages another of said cam bars said wing plate will be returned to its original position and rollers and additional fingers and cam plates to fold and tuck the ends of each wrapper to complete the wrapping.

References Cited
UNITED STATES PATENTS

| | | | |
|---|---|---|---|
| 2,720,734 | 10/1955 | Vogt | 53—122 |
| 3,129,546 | 4/1964 | Redmond | 53—122 |
| 3,266,214 | 8/1966 | Kramme | 53—122 |

WILLIAM W. DYER, JR., *Primary Examiner.*

FRANK E. BAILEY, ROBERT C. RIORDON, TRAVIS S. McGEHEE, *Examiners.*

R. L. FARRIS, *Assistant Examiner.*

UNITED STATES PATENT OFFICE
CERTIFICATE OF CORRECTION

Patent No. 3,375,636  April 2, 1968

Sanford Redmond

It is certified that error appears in the above identified patent and that said Letters Patent are hereby corrected as shown below:

Column 1, line 45, "this" should read -- the --. Column 2, line 53, "wine" should read -- wing --; line 58, ", precede" should read -- proceed --.

Signed and sealed this 19th day of August 1969.

(SEAL)
Attest:

Edward M. Fletcher, Jr.  WILLIAM E. SCHUYLER, JR.
Attesting Officer  Commissioner of Patents